United States Patent
Fabry et al.

(10) Patent No.: US 6,936,460 B1
(45) Date of Patent: Aug. 30, 2005

(54) MICROBIAL ACTIVATION OF LAYER SILICATES

(75) Inventors: Christian Fabry, Tallahassee, FL (US); Stefan Dick, Belen, NM (US); Werner Zschau, Steinebach (DE)

(73) Assignee: Sud-Chemie AG, Munich (DE)

( * ) Notice: Subject to any disclaimer, the term of this patent is extended or adjusted under 35 U.S.C. 154(b) by 0 days.

(21) Appl. No.: 09/830,527

(22) PCT Filed: Aug. 6, 1999

(86) PCT No.: PCT/EP99/05711

§ 371 (c)(1),
(2), (4) Date: Apr. 26, 2001

(87) PCT Pub. No.: WO00/25910

PCT Pub. Date: May 11, 2000

(30) Foreign Application Priority Data

Oct. 30, 1998  (DE) ................................ 198 50 129

(51) Int. Cl.[7] ............................ C12P 1/00; C12S 1/00; C01B 33/44
(52) U.S. Cl. ..................... 435/262; 435/822; 435/917
(58) Field of Search ........................ 435/262, 262.5, 435/821, 517, 512, 917, 822

(56) References Cited

U.S. PATENT DOCUMENTS

| | | |
|---|---|---|
| 1,492,184 A | 4/1924 | Wier et al. |
| 1,752,721 A | 4/1930 | Bierce |
| 2,813,821 A * | 11/1957 | Updegraff .................. 435/243 |
| 3,414,524 A | 12/1968 | Abson et al. |
| 4,847,226 A | 7/1989 | Alexander |
| 5,008,226 A | 4/1991 | Taylor et al. |
| 5,008,227 A | 4/1991 | Taylor et al. |

FOREIGN PATENT DOCUMENTS

| | | |
|---|---|---|
| DE | C-304706 | 6/1917 |
| EP | 0398636 | 11/1990 |
| EP | 0631998 A1 | 1/1995 |
| JP | 01126393 | * 11/1986 |
| JP | 5221631 | 8/1993 |
| SU | 649 683 | 5/1975 |

OTHER PUBLICATIONS

Grudev et al. Biotechno. Bioeng. Symp. (1986), 16(Biotechoo. Min. Met. Refin. Fossil Fuel Process. Ind.), 91-99.*
Ryu et al. Journal of Fermentation and Bioengineering. 1995. 80 (1), 46-52.*
Rutkowski et al. Przemsyl Chemiczny. (1981), 60 (5), 287-289; [STN CAPLUS 198:535117/an].*
Kusnierova et al. Mineralia Slovaca (1996), 28, 365-367.*
Chaudhury et al. Erzmetall. (1990), 43 (5), 210-212.*
*Chemical Abstracts*, vol. 126, No. 7, 1997, Ref. 86899e.
*Chemical Abstracts*, vol. 125, No. 18, 1996, Ref 224845s.
*Chemical Abstracts*, vol. 123, 1995, Ref. 120800r.
*Chemical Abstracts*, vol. 113, 1190, Ref. 83641k.
*Chemical Abstracts*, vol. 105, 1986, Ref. 81646b.
*Chemical Abstracts*, vol. 92, 1980, Ref. 70182j.

* cited by examiner

*Primary Examiner*—Vera Afremova
(74) *Attorney, Agent, or Firm*—Scott R. Cox

(57) ABSTRACT

A process for the microbial activation of layer silicates.

23 Claims, No Drawings

MICROBIAL ACTIVATION OF LAYER SILICATES

The invention pertains to a process for the activation of layer silicates with use being made of microorganisms.

U.S. Pat. No. 1,492,184 describes the activation of raw clay with maximally 10% by weight of concentrated acid. It is preferable that a pre-dried and ground raw clay be impregnated in this regard. Montmorillonite, bauxite, willonite, pyrophyllite, kaolinite and fuller's earth are designated as examples of "clays".

U.S. Pat. No. 1,752,721 describes a process for the treatment of "earthy materials" in order to increase their adsorption properties; accordingly, a clay material is mixed with solid oxalic acid and then it is heated, in the absence of added water, in order to bring about a reaction between the oxalic acid and the clay mineral. The clay mineral is treated with approximately 1 to 5% of oxalic acid in this connection.

DE-C-304706 describes a process for increasing the decolorizing power of fuller's earth. In this process, the raw fuller's earth is stirred with the acid to give a doughy mass, and then it is dried.

A process for the treatment of clay is known from U.S. Pat. No. 4,847,226 in which the clay is extruded, ground and then added to an aqueous solution of an acid in order to produce a suspension; the suspension is heated, and then the acid-treated clay is separated, washed, filtered off and dried. The intended purpose of the treatment is to improve the ability of the clay to filter out impurities from liquids. In particular, oil-soluble dyes are removed from oils.

The objective of the invention is to provide a process for the activation of layer silicates without the addition of corrosive acids that can cause intense burns and that endanger natural water systems. whereby this process is superior to the prior art from the standpoints of operational safety and environmental protection and also from an economic point of view.

Surprisingly, it has now been found that the activation of layer silicates can take place via the use of microorganisms without any addition of an acid or, as the case may be, a solution of an acid.

The use of acid-producing microorganisms for leaching out residues from low grade copper ores is already known in the prior art. In addition, the growth of such microorganisms on ores, such as pyrites, is exploited in order to assist flotation. A review of these and further applications of the treatment and processing of ores and for metal recovery is to be found in the publication by C. L. Brierley: Bacteria as aids in mining; Spetrum der Wissenschaft: Industrielle Mikrobiologie, 60 (1989).

The bacterial oxidation of elemental sulfur is exploited in agriculture in order to make sulfate available to plants and to make phosphate and micro-nutrient substances available as well.

The use of microorganisms for the activation of layer silicates is not known in the prior art.

The term "activation" is understood to mean a process for increasing the decolorizing activity of the layer silicate.

The activated layer silicates in accordance with the invention can be used, in particular, as fuller's earth materials for the treatment of oils, fats or waxes.

Glyceride oils, waxes and fats and mineral oils are passed through one or more adsorptive treatment stages using inorganic adsorbents during their refining. The oil or fat that is to be treated is thereby brought into contact with an inorganic adsorbent at an elevated temperature. The adsorbent filters from the oil substances that are disadvantageous in subsequent processes or for storage, such as e.g. pigments, phospholipids, materials that produce turbidity, metals, free fatty acids, oxidized compounds, etc. In order to do this, the adsorbent requires adsorptive properties, in order to permit the removal of phospholipids or chlorophyll materials, and catalytic properties for degrading dyes or peroxide compounds that are contained in the oil.

Because of their advantageous properties, especially their high specific surface area, sorption capacity and ion exchange capacity, the activated layer silicates that are prepared in accordance with the invention can also find use in other sectors.

The layer silicates that are listed in Ullmaiin's Encyklopädie der technischen Chemie ["Encyclopedia of industrial Chemistry"], Volume 21, pages 370–375 (1982) are included among the layer silicates that are usable in the process in accordance with the invention. In particular, use can be made of natural and synthetic clay minerals that are capable of being activated, such as the smectites—including montmorillonite, beidellite, nontronite, wolchonskoite, stevensite, hectorite, swinefordite, saponite and sauconite—along with vermiculites, illites, mixed layer minerals, palygorskite (attapulgite) and sepiolite. The latter two materials are also designated as hormites. The clay minerals can be present in their H form, their alkali metal form or their alkaline earth form.

In accordance with a preferred form of embodiment in accordance with the invention, the layer silicate is a three layer silicate, e.g. a naturally occurring smectitic clay, especially a bentonite clay or a palygorskite clay or mixtures thereof.

Palygorskite clays comprise attapulgite clays that are also known as attalpulgus clays, or Georgia fuller's earths. As a rule, these clays consist primarily of the mineral attapulgite, i.e. a crystalline, hydrated magnesium aluminum silicate, but they can also contain considerable quantities of other minerals, such as e.g. bentonite (montmorillonite), calcium carbonate, quartz and feldspar and, in many cases, sepiolite. The preferred clays contain at least 10% by weight, and up to 90% by weight, of attapulgite and, preferably, up to 20 to 60% by weight thereof.

Non-calcined, naturally occurring mixtures of palygorskite clay and calcium bentonite clay are especially preferred. Such natural mixtures can contain pyrites that can serve as a substrate for sulfur-oxidizing bacteria and iron-oxidizing bacteria such as *Thiobacillus ferrooxidans*.

An attapulgite bentonite mixture of clays is used in accordance with an especially preferred form of embodiment.

The microorganisms that are used for activation in accordance with the invention are bacteria, archaebacteria or fungi e.g. of the *Aspergillus, Acidianus, Acidimicrobiumn, Acidiphilium, Acidobacterium, Acidocella, Alicyclobacillus, Leptospirillium, Metallosphaera, Picrophylus, Sarcina, Stygiolobus, Sulfobacillus, Sulfolobus, Thermoplasma, Thiobacillus* and *Thiomonas* strains. In addition to the acid-producing bacteria that are preferred here—especially the so-called sulfuric acid bacteria—use can also be made of nitric acid bacteria and acetic acid bacteria as well as microorganisms that produce oxalic acid, citric acid, gluconic acid or other organic acids.

The use of bacteria that oxidize pyrites is especially advantageous when the layer silicate that is used already contains pyrites, so that this nutrient substance for the bacteria does not have to be added. In addition, it has been found that some naturally occurring bentonite/attapulgite clay mixtures already naturally contain *Thiobacillus fer-*

*rooxidans* and *Thiobacillus thiooxidans* in small quantities, and these can be induced to activate the layer silicate.

The last two types of bacteria that were designated are strongly chemolithoautotrophic, i.e. their growth cannot be stimulated by providing organic materials, such as nutrient substances or vitamins. Both belong to the group of acidophilic bacteria and they prefer pH values around 2 and temperatures of around 30° C.

Use can be made of both natural type strains of the microorganisms and also strains that have been cultivated in the laboratory (e.g. *Thiobacillus thiooxidans* DSMZ-11478; *Aspergillus niger* DSMZ-823; see the DSMZ catalog, 1998). Prior cultivation of the microorganisms offers the advantage that adaptation can be carried out using the conditions that have been selected for the activation of the layer silicate. In addition, the microorganisms can be selected conventionally in terms of advantageous properties (e.g. rapid growth under the conditions that have been selected for activation).

In the case of using aerobic microorganisms (such as, for example, *T. thiooxidans, T. ferrooxidans* and *A. niger*), an adequate supply of oxygen has to be ensured during activation of the layer silicate. This can be ensured, for example, by regular mixing in with the layer silicate (every 1 to 7 days) and avoiding excessive compaction. The process of mixing in also encourages uniform distribution, more rapid multiplication and higher metabolic efficiency of the microorganisms; as a result, activation of the layer silicate can be influenced in a positive manner.

It has been found that some naturally occurring bentonite/attapulgite clay mixtures already contain low concentrations of *T. thiooxidans* and *T. ferrooxidans*. As a rule, however, it is preferable to add the bacteria to the layer silicate. This can take place, for example, by spraying the layer silicate with a concentrated bacterial culture or by mixing with an inoculant material that has a high concentration of bacteria. The following are suitable, in particular, as the inoculant material: a sample of the layer silicate, which is to be activated or which, as the case may be, has already been bacterially activated, or a bacterial substrate (such as sulfur or pyrites) with a concentration of $10^2$–$10^{10}$ bacteria/g of inoculant material, or mixtures thereof.

In accordance with one embodiment in accordance with the invention, a nutrient substrate in the form of sulfur, pyrites and/or a nutrient salt solution is added to the layer silicate for better growth of the microorganisms. The addition of sulfur is required, in particular, when use is to be made of purely sulfur-oxidizing microorganisms and the layer silicate naturally contains no source of energy (sulfur source or iron source, respectively) that is capable of being utilized by the microorganism in question.

The treatment of the layer silicate with the microorganisms is carried out under conditions that are favorable for the microorganism (or microorganisms) in question. The technical expert will be familiar with these conditions on the basis of the relevant prior art.

Thus, for example, one has to ensure that the microorganisms receive an adequate supply of nutrient substances (e.g. N, K, Ca, Mg, P), vitamins, metabolic substrates, gases (e.g. oxygen, carbon dioxide). If the material that is to be activated naturally contains too little of the substances that are required by the microorganisms that are used in each case, then these can be added to the material.

In the case of using *T. ferrooxidans* and *T. thiooxidans*, nutrient salts and/or energy-supplying substrates (e.g. sulfur, pyrites) can be added to the material that is to be activated. Since the designated bacteria are, of necessity, chemolithoautotrophic organisms, these cannot be stimulated via an addition of organic substrates, vitamins or nutrient substances. In some cases, an excessive supply of nutrient salts, in particular, have a negative influence on the activity of the microorganisms.

In the case of utilizing *Aspergillus niger*, glucose, sucrose or molasses can be added to the substrate.

An adequate water content of the medium or, as the case may be, the layer silicate, and maintenance of a suitable temperature have to be borne in mind as well. Thus, for example, temperatures of approximately 20 to approximately 35° C. and, especially, approximately 30° C., and a water content of more than approximately 15% by weight and, in particular, approximately 60 to 70% by weight based on the layer silicate are preferred when using *T. ferrooxidans, T. thiooxidans* or *A. niger*. Aqueous suspensions can also be used.

In order to control the water content when carrying out activation in the open air, it can be necessary to guard against intensive irrigation via rainfall (e.g. by storing under a roof, or by applying air-permeable agricultural foils) or to irrigate artificially in the case of dry weather.

The optimum duration of the activation process in individual cases is dependent on the microorganisms that are used and on the nature of the layer silicate that is used and on the ambient conditions, and it can be ascertained with ease by, the technical expert via empirical trials on the basis of the decolorizing activity of the layer silicates that have undergone treatment. In general, microbial activation of the layer silicate is carried out over a period of 1 to 150 days. In some cases, however, it can be advantageous to carry out microbial activation over a longer period of time, e.g. for approximately one year. The duration of the activation process can frequently be shortened by carrying out mechanical size reduction of the pieces of the layer silicate after e.g. one week in order to generate new surfaces for bacterial colonization.

In accordance with one form of embodiment, the process in accordance with the invention comprises the following steps: fresh raw clay is broken up into pieces of the order of approximately 2 cm in size; as a result, a large surface area is generated that is accessible to the microorganisms and the air. The clay is then mixed or kneaded with 5–20% of inoculant clay with a high concentration of bacteria and, as a result, colonization with microorganisms is accelerated. Piles or stacks are formed that are approximately 10–50 cm high. Excessively high heaping up or compaction would prevent effective aeration. The temperature and water content of the clay are checked and kept as constant as possible during microbial activation. Regular and adequate mixing together and aeration of the clay can take place, for example, via a rotary hoe every 1–8 days. The reduction of the pH value can be measured after drying the clay, or directly via a soil pH meter. Part of the activated clay is used as the inoculant clay after the desired degree of activation has been reached (generally between pH 2 and pH 4). The remainder is dried and ground, whereby the microorganisms that are contained in the clay are also killed off.

The use of microorganisms for the activation of layer silicates is also the subject of the invention.

An especially advantageous feature of the process in accordance with the invention is that one does not have to work with corrosive acids that cause intense burns and endanger natural water systems. Thus it is superior to the prior art from the standpoints of operational safety and environmental protection. Since only very cheap raw materials, such as pyrites (which are optionally already present in the layer silicate), sulfur and water, are used for microbial activation, the process in accordance with the invention is superior from the economic standpoint as well. Thus the pyrites being a hard accompanying material do not need to be removed completely.

It has been found that the pH value or, as the case may be, the quantity of acid that is set free by the microorganisms does not correlate strictly with the activity of the layer silicate that is to be treated. This suggests that microbial activation in accordance with the invention differs from purely acidic activation, and that further metabolic products are involved.

Free iron ions, which are present in the activated layer silicate and which can interfere with the decolorization of oil, are complexed by the Fe-chelating materials that are produced by the microorganisms that are used. In addition, many of the microbial organic acids complex multivalent cations, such as $Al^{3-}$ or $Ca^{2-}$, and, as a result, these are removed from the equilibrium and activation of the layer silicate.

In addition, free phosphate is incorporated into organic compounds via the microorganisms and these organic compounds and the microorganisms adhere firmly to the layer silicate so that phosphate contamination is reduced in the oil that is to be decolorized.

In addition, interfering cations can be fixed (so-called "bio-accumulation") via absorption into the microorganisms. The accumulation of $Cd^{2-}$, $Co^{2-}$, $Cu^{2-}$, $Cr^{3-}$, $Fe^{3-}$ and $Ni^{2-}$ has been demonstrated in the case of thio-bacteria, and the accumulation of radionuclides, $Co^{2-}$, $Cu^{2-}$ and $Zn^{2-}$ has been demonstrated in the case of *A. niger*.

The surface of the mineral is also rendered more hydrophobic by the microorganisms. The increased hydrophobicity of the surface of the layer silicate can lead to better wetting of the particles of fuller's earth by the oils that are to be decolorized.

Additional advantages can be traced back to uniform, in situ activation by the microorganisms, and to the gradual release of acids or, as the case may be, metabolic products. Since the microorganisms that are preferably used, such as *T. ferrooxidans* and *T. thiooxidans*, no longer grow at excessively low pH values (e.g. less than 1.5), an excessively high residual acid concentration, which is disadvantageous for the decolorization of oils, can also be avoided in the activated layer silicate. As soon as the pH value has declined too much, the microorganisms terminate their growth and the production of acid. The microorganisms thus act like an internal regulating system for the activation of the layer silicate. Local pH peaks, which arise with ease in the case of an external addition of acid, can also be avoided in this way.

The degradation of pyrites, which is contained in the raw clay and which is utilized by *T. ferrooxidans* as a nutrient substrate during activation, can be advantageous in some applications of the activated layer silicates since pyrites exhibits an abrasive action during the grinding of the fuller's earth.

The examples of embodiments that follow below will demonstrate the invention and the advantages relative to the prior art. However, the invention is not limited to the examples below.

EXAMPLES

Examples 1–6

Freshly mined attapulgite (palygorskite)/bentonite clay with a solids content of 44% was used as the starting material for comparison Examples 1 and 2 and for Examples 3–6. According to x-ray phase analysis and chemical composition tests, this clay comprises 55% palygorskite, 35% Ca montmorillonite, 5% quartz, 3% calcite and 1.5% pyrites. The clay was mechanically reduced to a grain size of approximately 2 cm. This clay, which had been treated in that way, is designated raw clay A in the following sections.

Example 1 (Comparison)

A sample of raw clay A was dried at 80° C. to give a water content of 15% and ground to give a sieve residue (64 im) of 25%; it was then dried at 110° C. to give a water content of 8%. After suspending 8 parts of the sample in 100 parts of water, the pH value of the sample was measured by means of a pH measurement electrode.

Decolorization experiments were carried out using rape-seed oil (100 g of oil; 0.75 g of sample; p= 30 mbar; T=110° C.; t=30 minutes) and soy oil (100 g of oil; 0.50 g of sample; p=30 mbar; T= 100° C.; t=30 minutes) in order to ascertain the activity of the sample for decolorizing vegetable oil. The decolorizing activity was assessed on the basis of red values, which were ascertained by means of a Lovibond calorimeter, and on the basis of the spectrophotometrically measured chlorophyll concentrations. In both cases, smaller values signify higher decolorizing activity. The results are indicated in Table I (decolorization of rape-seed oil) and Table II (decolorization of soy oil); in every case, the numerical data are average values from three experiments.

Example 2 (Comparison)

340 g of raw clay A were intensively kneaded for 5 minutes with 50 ml of water and 3 g of concentrated sulfuric acid. The product was then dried and ground as in comparison Example 1. The measurement of the pH value and that of the decolorizing activity took place as in comparison Example 1. The results are indicated in Tables I and II.

Example 3

340 g of raw clay A were mixed with 110 ml of water and homogenized with the help of a sterile wooden spatula. Incubation then took place in a climatic chamber at a constant 30° C. and 100% atmospheric humidity. Homogenization of the sample was repeated once per week. Each week, a small aliquot portion was taken out and the pH value was measured as described in comparison Example 1.

When no further change in the pH value could be detected (68 days), the product was dried and ground as in comparison Example 1. The measurement of the pH value and that of the decolorizing activity for rape-seed oil took place as in comparison Example 1. The results are indicated in Table I.

Example 4

340 g of raw clay A were incubated as described in Example 3. After 42 days, 45 g of this material were taken out and mixed with 340 g of fresh raw clay A and 110 ml of water and homogenized with the help of a sterile wooden spatula. Incubation then took place in a climatic chamber at a constant 30° C. and 100% atmospheric humidity. Homogenization of the sample was repeated once per week. Each week, a small aliquot portion was taken and the pH value was measured as described in comparison Example 1.

When no further change in the pH value could be detected (21 days), the product was dried and ground as in comparison Example 1. The measurement of the pH value and that of the decolorizing activity for rape-seed oil took place as in comparison Example 1. The results are indicated in Table I.

Example 5

1 ml of a suspension of bacteria (*Thiobacillus ferrooxidans*; DSMZ strain 11477) and 7.0 g of pyrites (particle size<64 im) were added to 100 ml of a nutrient medium comprising 2.00 g/l of $(NH_4)_2SO_4$, 0.50 g/l of $K_2HPO_4$, 0.50 g/l of $MgSO_4 \cdot 7H_2O$, 0.10 g/l of KCl and 0.01 g/l of $Ca(NO_3)_2$, whereby this nutrient medium had been adjusted to a pH value of 2 using sulfuric acid. A stream of air was passed through this mixture at 30° C. until the pH value of the solution had fallen to 1.75. The pyrites were separated from the solution by means of centrifugation at 1.500 g (5 minutes) and then suspended in 100 ml of water and centrifuged again. The bacterial cells were harvested from the combined centrifuged liquids by centrifugation at 8,000 g (15 minutes) and then they were suspended in 110 ml of water.

340 g of raw clay were treated in an autoclave under standard conditions (T=120° C.; p=2 bar; t= 30 minutes) in order to kill off the microorganisms that were contained in the raw clay. The raw clay was then mixed with 110 ml of bacterial suspension and homogenized with the help of a sterile wooden spatula; incubation then took place in a climatic chamber at a constant 30° C. and 100% atmospheric humidity. Homogenization of the sample was repeated once per week. Each week, a small aliquot portion was taken out and the pH value was measured as described in comparison Example 1. When no further change in the pH value could be detected (56 days), the product was dried and ground as in comparison Example 1. The measurement of the pH value and that of the decolorizing activity for rape-seed oil took place as in comparison Example 1. The results are indicated in Table I.

Example 6

Spores of *Aspergillus niger* (DSMZ strain 823) were added to 110 ml of a sterile nutrient medium comprising 1.60 g/l of $NH_4NO_3$, 0.30 g/l of $K_2HPO_4$, 0.20 g/l of $MgSO_4 \cdot 7H_2O$, and 6.50 g of glucose, whereby this nutrient medium had been adjusted to a pH value of 4.0 using sulfuric acid. A stream of air was passed through this mixture at 30° C. until the pH value of the solution had fallen to 3.0.

340 g of raw clay were treated in an autoclave under standard conditions (T=120° C.; p=2 bar; t= 30 minutes) in order to kill off the microorganisms that were contained in the raw clay. The raw clay was then mixed with the fungal suspension and homogenized with the help of a sterile wooden spatula; incubation then took place in a climatic chamber at a constant 30° C. and 100% atmospheric humidity. Homogenization of the sample was repeated daily. Each week, a small aliquot portion was taken out and the pH value was measured as described in comparison Example 1. When no further change in the pH value could be detected (21 days), the product was dried and ground as in comparison Example 1. The measurement of the pH value and that of the decolorizing activity for soy oil took place as in comparison Example 1. The results are indicated in Table II.

Examples 7–11

South American bentonite with a solids content of 60% was used as the starting material for comparison Examples 7–9 and for Examples 10–11. According to x-ray phase analysis and chemical composition tests, this clay comprises 90% disordered smectite/illite mixed layer minerals, 2% quartz, 2% calcite and 6% feldspar. The clay was mechanically reduced to a grain size of approximately 2 cm. This clay, which had been treated in that way, was designated "raw clay B" in the following sections.

Example 7 (Comparison)

A sample of the raw clay B was dried at 80° C. to give a water content of 15% and ground to give a sieve residue (64 im) of 25%; it was then dried at 100° C. to give a water content of 8%. After suspending 8 parts of the sample in 100 parts of water, the pH value of the sample was measured by means of a pH measurement electrode.

Decolorization experiments were carried out using rape-seed oil (100 g of oil; 0.75 g of sample; p= 30 mbar; T=110° C.; t=30 minutes) and soy oil (100 g of oil; 0.50 g of sample; p=30 mbar; T= 100° C.; t=30 minutes) in order to ascertain the activity of the sample for decolorizing vegetable oil. The decolorizing activity was assessed on the basis of red values, which were ascertained by means of a Lovibond color meter, and on the basis of the spectrophotometrically measured chlorophyll concentrations. In both cases, smaller values signify higher decolorizing activity. The results are indicated in Table I (decolorization of rape-seed oil) and Table II (decolorization of soy oil); in every case, the numerical data are average values from three experiments.

Example 8 (Comparison)

250 g of raw clay B were intensively kneaded for 5 minutes with 120 ml of water and 3 g of concentrated sulfuric acid. The product was then dried and ground as in comparison Example 7. The measurement of the pH value and that of the decolorizing activity for soy oil and rape-seed oil took place as in comparison Example 7. The results are indicated in Tables I and II.

Example 9 (Comparison)

250 g of raw clay B were mixed with 125 ml of water and homogenized with the help of a sterile wooden spatula. Incubation then took place in a climatic chamber at a constant 30° C. and 100% atmospheric humidity. Homogenization of the sample was repeated once per week. Each week, a small aliquot portion was taken out and the pH value was measured as described in comparison Example 7.

After 68 days, the product was dried and ground as in comparison Example 7. The measurement of the pH value and that of the decolorizing activity for soy oil and rape-seed oil took place as in comparison Example 7. The results are indicated in Tables I and II.

Example 10

340 g of raw clay A were incubated as described in Example 3.

After 42 days, 46 g of this material were taken out and mixed with 250 g of raw clay B, 7 g of pyrites and 125 ml of water and homogenized with the help of a sterile wooden spatula. Incubation then took place in a climatic chamber at a constant 30° C. and 100% atmospheric humidity. Homogenization of the sample was repeated once per week. Each week, a small aliquot portion was taken and the pH value was measured as described in comparison Example 7.

When no further change in the pH value could be detected (42 days), the product was dried and ground as in comparison Example 7. The measurement of the pH value and that of the decolorizing activity for soy oil and rape-seed oil took place as in comparison Example 7. The results are indicated in Tables I and II.

Example 11

340 g of raw clay A were incubated as described in Example 3.

After 42 days, 46 g of this material were taken out and mixed with 250 g of raw clay B, 7 g of sulfur and 125 ml of water and homogenized with the help of a sterile wooden spatula. Incubation then took place in a climatic chamber at a constant 30° C. and 100% atmospheric humidity. Homogenization of the sample was repeated once per week. Each week, a small aliquot portion was taken and the pH value was measured as described in comparison Example 7.

When no further change in the pH value could be detected (56 days), the product was dried and ground as in comparison Example 7. The measurement of the pH value and that of the decolorizing activity took place as in comparison Example 7. The results are indicated in Tables I and II.

TABLE I

Decolorization of rape-seed oil

|  | pH | Red value | Chlorophyll A [ppb] | Time [d] | Brief description |
|---|---|---|---|---|---|
| Comparison example 1 | 6.9 | 5.5 | 650 | 0 | raw clay A |
| Comparison example 2 | 2.8 | 4.4 | 300 | 0 | raw clay A + sulfuric acid |
| Example 3 | 3.4 | 4.2 | 225 | 68 | raw clay A incubated |
| Example 4 | 3.4 | 4.1 | 220 | 21 | raw clay A + inoculant clay |
| Example 5 | 3.4 | 4.3 | 240 | 56 | raw clay A inoculated with DSMZ strain |
| Comparison Example 7 | 8.4 | 7.8 | 800 | 0 | raw clay B |
| Comparison Example 8 | 2.3 | 4.6 | 310 | 0 | raw clay B + sulfuric acid |
| Comparison Example 9 | 8.2 | 7.8 | 790 | 68 | raw clay B incubated |
| Example 10 | 2.6 | 4.2 | 220 | 42 | raw clay B + pyrites + inoculant clay |
| Example 11 | 2.8 | 4.4 | 290 | 56 | raw clay B + sulfur + inoculant clay |

TABLE II

Decolorization of soybean oil

|  | pH | Red value | Chlorophyll A [ppb] | Time [d] | Brief description |
|---|---|---|---|---|---|
| Comparison Example 1 | 6.9 | 6.4 | 290 | 0 | raw clay A |
| Comparison Example 2 | 2.8 | 6.7 | 180 | 0 | raw clay A + sulfuric acid |
| Example 6 | 3.4 | 6.0 | 170 | 21 | raw clay A inoculated with A. niger |
| Comparison Example 7 | 8.4 | 14.0 | 680 | 0 | raw clay B |
| Comparison Example 8 | 2.3 | 9.2 | 170 | 0 | raw clay B + sulfuric acid |
| Comparison Example 9 | 8.2 | 13.8 | 690 | 68 | raw clay B incubated |
| Example 10 | 2.6 | 6.2 | 150 | 42 | raw clay B + pyrites + inoculant clay |
| Example 11 | 2.8 | 6.5 | 170 | 56 | raw clay B + sulfur + inoculant clay |

As can be seen from Table 1, it was possible to induce the natural strain populations of *T. ferrooxidans* and *T. thiooxidans*, which were present in raw clay A, to activate the layer silicate by means of suitable conditions. The activated fuller's earth that was obtained exhibited good results for the decolorization of rape-seed oil and surpassed both raw clay A (comparison Example 1) and a fuller's earth (comparison Example 2), which was prepared in accordance with the prior art by activation with concentrated sulfuric acid, in terms of the red values and the removal of chlorophyll.

As Example 4 shows, the duration of activation using raw clay A can be drastically shortened by mixing it with inoculant clay, which already contains large wild strain populations of *T. ferrooxidans* and *T. thiooxidans*, with equally good decolorizing activity for rape-seed oil.

A further addition of a nutrient solution to the raw clay samples in Examples 3 and 4 did not lead to increased activity of the bacteria in the first 30 days. This can be traced back to the feature that the natural strain populations of *T. ferrooxidans* and *T. thiooxidans*, which were present in raw clay A, had become adapted to very low quantities of nutrient salt over a period of many generations.

Example 5 shows that, in addition to natural strains, cultivated strains of *T. ferrooxidans* are also suitable for the activation of the layer silicate in raw clay A. The longer duration of the activation process in comparison to Example 4 can be traced back to the feature that the strains, which have become adapted to higher nutrient salt concentrations, first have to become adapted to the lower concentrations in raw clay A.

As Example 6 documents, it was possible to undertake activation of the layer silicates, which were contained in raw clay A, by means of the *Aspergillus niger* fungus. Glucose as the nutrient source had to be added to the raw clay in this case. It can be seen from Table II that, relative to comparison Example 1, Example 6 shows considerably better removal of chlorophyll and a better red value for the decolorization of soy oil. By contrast, treatment of raw clay A with sulfuric acid in accordance with the prior art (comparison Example 2) results in almost equally good absorption of chlorophyll but a worsening of the red value, whereby this can be traced back to the low pH value of the adsorption agent and to the high proportion of residual acid that is associated therewith.

Examples 10 and 11 show that, in addition to pyrites-containing attapulgite earths, other layer silicates are likewise capable of being activated via the use of microorganisms.

As far as the removal of red components and, in particular, chlorophyll is considered, comparison Example 7 shows very bad results for the decolorization of both rape-seed oil and soy oil. According to comparison Example 8, a distinct improvement in decolorization activity is possible via a treatment with sulfuric acid that corresponds to the prior art (see Tables I and II).

If raw clay B is merely incubated (comparison Example 9), then no improvement in decolorizing activity occurs. This can be traced back to the deficiency in energy-supplying accompanying substances (such as e.g. pyrites) in raw clay B and the absence, which is related thereto, of microorganisms (e.g. *T. ferrooxidans*) that utilize these accompanying substances.

Example 10 shows that activation of the layer silicate in raw clay B can be achieved by an addition of pyrites as the supplier of energy together with inoculant populations of *T. ferrooxidans* and *T. thiooxidans* from raw clay A and subsequent incubation. In comparison to raw clay B (comparison Example 7) and raw clay B that had been activated in accordance with the prior art (comparison Example 8), a distinct improvement in decolorizing action is found both in rape-seed oil (Table I) and in soy oil (Table II). The duration of the activation process has been prolonged relative to Example 4. It is probable that the bacteria, which have become adapted to the conditions in raw clay A, first have to become adapted to the ambient conditions that prevail in raw clay B.

It can be seen from Example 11, that activation of the layer silicate in raw clay B can also occur by supplying elemental sulfur, followed by inoculation with incubated raw clay A and subsequent incubation. The duration of activation is further prolonged relative to Example 10 because the wild strain populations of *T. thiooxidans* from raw clay A have to become adapted not only to the changed conditions in raw clay B, but also to the non-adapted energy source. Relative to comparison Examples 7 and 8, the layer silicate that was activated in accordance with Example 11 exhibits improved activity levels for decolorizing rape-seed oil and soy oil. In comparison to Example 10, lower decolorizing activity was found in the two oils that were investigated; in contrast to this. Example 11 offers the possibility of activation without the addition of pyrites.

What is claimed is:

1. A process for increasing the decolorizing activity of a layer silicate for treatment of oils, fats and waxes comprising steps of treating
    without the addition of an acid, other than the acid produced by an acid-producing microorganism, the layer silicate, by the addition of acid-producing microorganism until a pH value of the layer silicate between 2 and 4 is obtained, thereby activating the layer silicate, and measuring the decolorizing activity of the activated layer silicate.

2. The process of claim 1 wherein the layer silicate comprises a smectite clay.

3. The process of claim 1 wherein the layer silicate comprises a montmorillonite clay.

4. The process of claim 3 wherein the montmorillonite clay comprises a bentonite clay.

5. The process of claim 1 wherein the layer silicate comprises a palygorskite clay.

6. The process of claim 4 wherein the layer silicate further comprises a palygorskite clay.

7. The process of claim 1 wherein the acid-producing microorganism comprises a sulfur-oxidizing bacteria.

8. The process of claim 1 wherein the acid-producing microorganism comprises an iron-oxidizing bacteria.

9. The process of claim 7 wherein the sulfur-oxidizing bacteria comprises *Thiobacillus thiooxidans*.

10. The process of claim 8 wherein the iron-oxidizing bacteria comprises *Thiobacillus ferrooxidans*.

11. The process of claim 1 wherein the acid-producing microorganism produces citric acid.

12. The process of claim 11 wherein the citric acid-producing microorganism comprises *Aspergillus niger*.

13. The process of claim 1 wherein the layer silicate is in the form of raw clay and wherein the process further comprises breaking up the raw clay into clumps with a size from about 0.5 cm to about 5 cm prior to treating the layer silicate.

14. The process of claim 1 further comprising adding the acid-producing microorganisms to an inoculant material prior to treating the layer silicate with the microorganisms which have been added to the inoculant material.

15. The process of claim 14 wherein the population of the microorganisms added to the layer silicate is from about $10^2$ to about $10^{10}$ bacteria/g of the inoculant material.

16. The process of claim 1 further comprising maintaining the temperature of the layer silicate during treating within the range from about 20 to about 35° C.

17. The process of claim 1 further comprising maintaining the water content of the layer silicate during treating within a range from about 15 percent by weight to about 70 percent by weight.

18. The process of claim 14 wherein the inoculant material added to the layer silicate comprises about 5 to about 20 percent of the overall composition after the inoculant material has been added.

19. The process of claim 1 further comprising mixing and aerating the layer silicate while it is being treated with the acid-producing microorganism.

20. The process of claim 19 wherein the treating process occurs for a period of time from about 1 to about 365 days.

21. The process of claim 1 further comprising adding nutrients for the microorganisms to the layer silicate prior to treating with the acid-producing microorganisms.

22. The process of claim 21 wherein the nutrients added comprise sulfur-containing products.

23. The process of claim 1 wherein the pH level is determined by suspending 8 parts of a sample of the treated layer silicate in 100 parts of water and measuring the pH-value by means of a pH measurement electrode.

* * * * *